(No Model.)

J. L. MUSSINA.
WHIFFLETREE HOOK.

No. 461,959. Patented Oct. 27, 1891.

Witnesses:
W. R. Courtland
E. C. Grigg.

Inventor
Jacob L. Mussina
by Reade Worthington
his attorneys

United States Patent Office.

JACOB L. MUSSINA, OF LEWISBERRY, PENNSYLVANIA.

WHIFFLETREE-HOOK.

SPECIFICATION forming part of Letters Patent No. 461,959, dated October 27, 1891.

Application filed February 13, 1891. Serial No. 381,345. (No model.)

*To all whom it may concern:*

Be it known that I, JACOB L. MUSSINA, a citizen of the United States, residing at Lewisberry, in the county of York and State of Pennsylvania, have invented certain new and useful Improvements in Whiffletree-Hooks; and I do hereby declare the following to be a full, clear, and exact description of the invention, such as will enable others skilled in the art to which it appertains to make and use the same.

This invention relates to whiffletree-hooks, and embodies certain structural features, which will be hereinafter fully described in this specification, and definitely pointed out in the appended claim.

Figure 1:
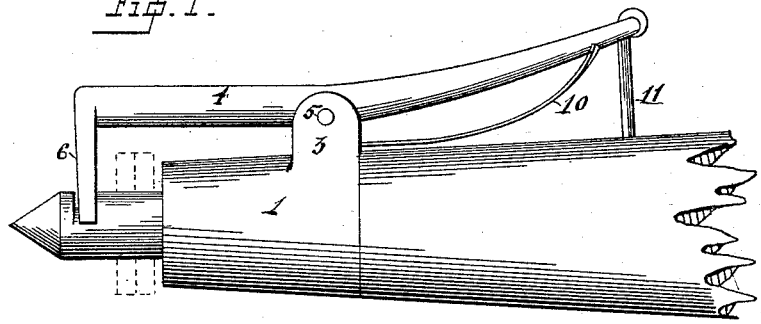
Figure 2:
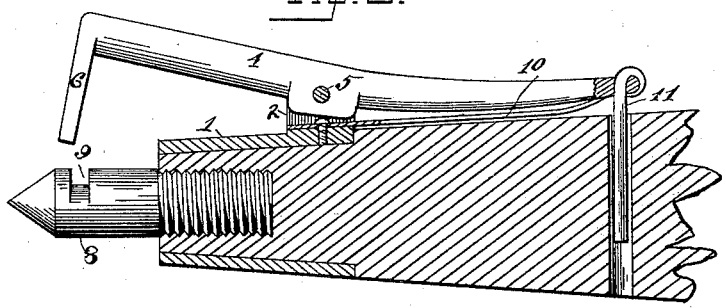
Figure 4:
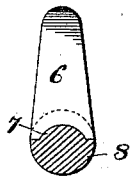
Figure 3:
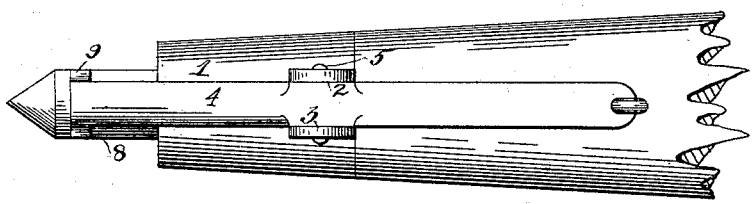

In the accompanying drawings, which illustrate the invention, Figure 1 is a side elevation of portion of a whiffletree provided with a hook constructed in accordance with my improvements. Fig. 2 is a view partly in section. Fig. 3 is a plan of Fig. 1. Fig. 4 is a detail view showing the mode of co-operation of the hook and trace-pin.

Upon a conical tube or socket 1 are ears 2 3, which form supports for a lever 4, mounted upon a pivot 5 supported in the ears. The socket or tube and the ears are integral, being cast in one piece. The lever is provided at one end with a hook or guard 6, provided with a recess, as shown at 7, at the bottom. The hook rests upon an iron or steel pin 8, screwed or otherwise secured in the end of the whiffletree. The pin is provided on its upper side at a point where the lower edge of the hook 6 bears upon it with a recess, as shown at 9, shaped to form a substantial rest for the bottom of the hook and prevent the latter from side thrust, as shown in Fig. 4. Between the ears 2 and 3, and secured to the socket by means of a screw or rivet, is a leaf-spring 10, which presses upon the inner arm of the lever 4 and tends to hold the hook in the recess of the pin. The extreme end of the lever carries a pivoted pin 11, which hangs in an aperture of the whiffletree. This pin prevents the tail of the horse from being switched under the arm of the lever and becoming tangled therein. In using the device the inner end of the lever is depressed, thus raising the hook from the pin, when the trace may be readily pushed upon the pin to a position corresponding to that indicated in dotted lines in Fig. 1. The hook is then allowed to drop, being held down by the pressure of the spring 10 and effectually confining the trace to the pin. The tip of the pin is pointed, so as to assist in guiding the trace into position. By means of the straight cylindrical pin with a pointed tip a trace with a circular eye the size of the pin can be used, thus adding to the strength of the trace and the ease with which it may be placed upon the pin. By reason of the structure of the hook and recessed pin it is almost impossible for the two parts to freeze together during sleety weather or to become otherwise locked, so that they may not be readily separated by applying a slight pressure to the inner end of the lever. The trace may be inserted in place or removed therefrom by a single movement of one hand, the lever being depressed and the trace pushed on or off the pin. As illustrated in the drawings, the pin where it enters the end of the whiffletree is threaded. It may, however, be simply a taper pin and be held friction-tight in a hole drilled in the end of the tree. It may, if desired, be cast integral with the shell which supports the lever, although I prefer the structure illustrated in the drawings.

Having thus described my invention, what I claim as new, and desire to secure by Letters Patent, is—

In a whiffletree-hook, the combination of the socket for mounting the hook upon the tree, pivoted lever 4, having a hook at its outer end and a pivoted pin 11 at the inner end hanging in an aperture in the tree, for the purpose described.

In testimony whereof I affix my signature in presence of two witnesses.

JACOB L. MUSSINA.

Witnesses:
MARY BRATTEN,
MARGARET BRATTEN.